United States Patent [19]
Miclette et al.

[11] Patent Number: 5,671,417
[45] Date of Patent: Sep. 23, 1997

[54] METHOD AND SYSTEM FOR INSERTING FLOATING CODE HOOKS INTO MULTIPLE VERSIONS OF CODE

[75] Inventors: Darren Miclette, deceased, late of Boynton Beach, Fla., by Kristina Miclette, executrix; Mark D. Rogalski, Boca Raton, Fla.

[73] Assignee: International Business Machines Corporation, Armonk, N.Y.

[21] Appl. No.: 514,510

[22] Filed: Aug. 11, 1995

[51] Int. Cl.$^6$ .................................................. G06F 7/00
[52] U.S. Cl. ............................................................ 395/704
[58] Field of Search ............................................. 395/704

[56] References Cited

U.S. PATENT DOCUMENTS

| | | | |
|---|---|---|---|
| 5,265,254 | 11/1993 | Blasciak et al. | 395/704 |
| 5,386,522 | 1/1995 | Evans | 395/704 |
| 5,450,586 | 9/1995 | Kuzara et al. | 395/704 |

*Primary Examiner*—Kevin A. Kriess
*Assistant Examiner*—John Q. Chavis
*Attorney, Agent, or Firm*—Mark S. Walker; Andrew J. Dillon

[57] ABSTRACT

A method and system of inserting a floating code hook at a proper position within a program's code having unknown length is provided. The method comprises the steps of estimating an insertion point for a code hook in a computer program loaded in a computer's memory and determining whether expected code is located at the estimated insertion point. If the expected code is located at the estimated insertion point, the method inserts the code hook into the program code at the insertion point. If the expected code is not located at the estimated insertion point, the method moves the estimated insertion point a predetermined number of bytes from the estimated insertion point to a new estimated insertion point, and again determines whether expected code is located at the estimated insertion point. This process continues until the proper insertion point is located, and the floating code hook is inserted.

33 Claims, 2 Drawing Sheets

5,671,417

METHOD AND SYSTEM FOR INSERTING FLOATING CODE HOOKS INTO MULTIPLE VERSIONS OF CODE

BACKGROUND OF THE INVENTION

1. Technical Field

The present invention relates in general to a method and system of operating system support for a program in a data processing system, and in particular to a method and system for determining insertion points for support code hooks in a program in a data processing system.

2. Description of the Related Art

To allow the operation of certain graphic user interface applications in a DOS-based operating system, a program or platform, such as Windows™ produced by Microsoft, Inc., must be utilized to enable execution of the applications on the DOS machine. For example, in OS/2™ for Windows, OS/2 is installed over an existing copy of Windows. When a Windows application is to be run, the Windows binaries are loaded into a Virtual DOS Machine, where the windows application is executed.

These Windows binaries are not capable of running with the same functionality in every type of operating system. Therefore, many operating systems provide support code to the Windows software that provides fixes and additional function to the Windows applications. For example, OS/2 for Windows provides support code that consists of module scripts. A module script consists of one or more subscripts which contain new fix code and a description of how this code is to be invoked. This support code is "hooked" into specific portions of the Windows code when the code is loaded into memory. This is accomplished by replacing an instruction of Windows code residing in memory with a "jump" instruction that sends the executing program to a particular support code script that will provide "seamless" support to the Windows platform. When the script completes execution, the code returns to the insertion point of the code hook and continues execution of the Windows program.

A particular script is interpreted by a Fix Manager Script Engine whenever Windows loads a module containing code to be "hooked" to that particular script. In OS/2 2.1 for Windows, the descriptions contained in the script includes the address offset of an insertion point in a window segment where the fix is to be hooked and where the segment is to resume execution after the fix code has executed. Unfortunately, for national language versions (NLV) of Windows (i.e. versions for different languages), the exact value of these address offsets may be skewed from the value of the offsets for the U.S. version of Windows. This occurs because the NLV Windows binaries are of slightly different lengths, due to the different number of characters required for various languages to present the same expression.

In the prior art, in order to account for the variety of support code hook offsets in NLV Windows code, tables describing the code hook offset differences are built for each NLV country and are included in the script code of the operating system Windows support software. Thereafter, whenever a particular Windows module is loaded into memory, the insertion point for the code hook of a particular support binary required for the particular NLV code being utilized is extracted from this hard-coded table.

There are a number of problems with this approach for accommodating national language code differences when implementing support code fixes. First, this approach requires a separate table for each NLV binary to be supported; thus, a new Windows binary cannot be easily supported without providing the user totally new support modules. Second, determining which NLV Windows binary is loaded into memory is not easy, as binary sizes, dates, and contents change over the life of various Windows products. Thus, determining which table entry is applicable can be difficult.

SUMMARY OF THE INVENTION

According to the present invention, a method and system of inserting a floating code hook at a proper position within a program's code is provided. The method comprises the steps of estimating an insertion point for a code hook in a computer program loaded in a computer's memory and determining whether expected code is located at the estimated insertion point. If the expected code is located at the estimated insertion point, the method inserts the code hook into the program code at the insertion point. If the expected code is not located at the estimated insertion point, the method moves the estimated insertion point a predetermined number of bytes from the estimated insertion point to a new estimated insertion point, and again determines whether expected code is located at the estimated insertion point. This process continues until the proper insertion point is located, and the floating code hook is inserted.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
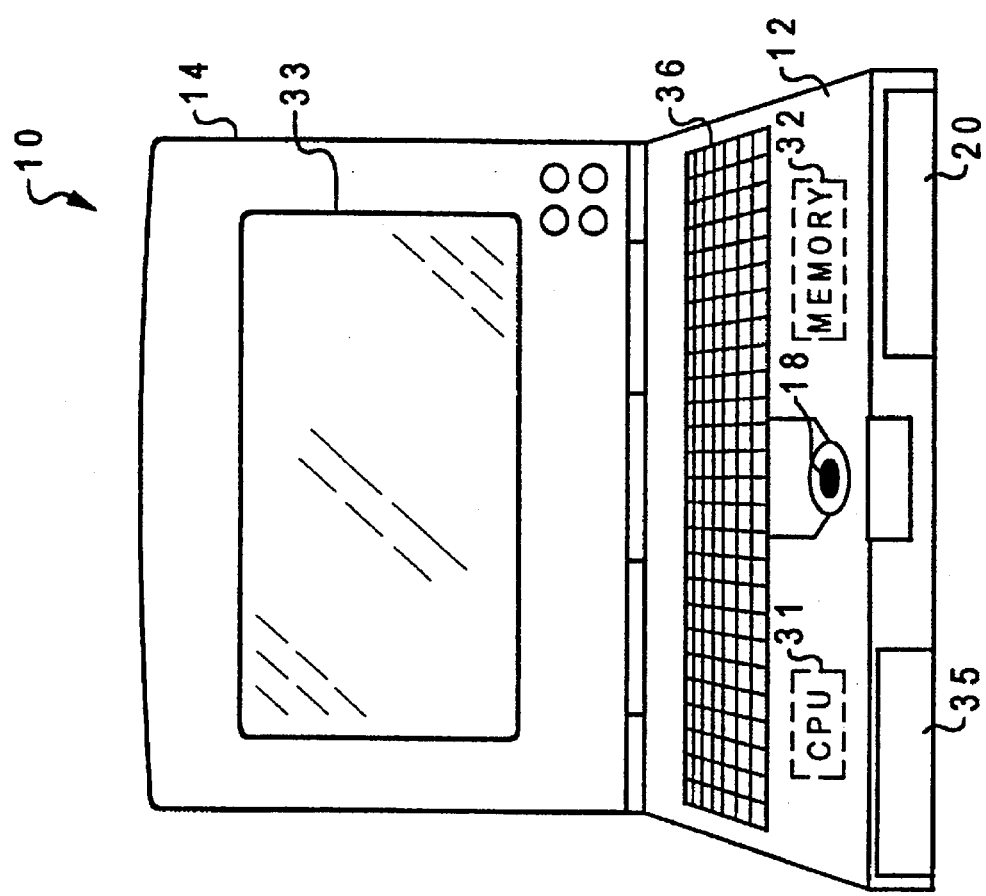
FIG. 1 depicts a data processing system suitable for implementing the method and system of inserting floating code hooks in computer code versions of unknown length, in accordance with a preferred embodiment of the present invention.

Referring now to the figures, and in particular to FIG. 1, there is depicted a data processing system suitable for implementing the method for inserting a code hook in multiple versions of a computer program, in accordance with the preferred embodiment of the present invention. Data processing system 10 is a standard personal computer system, such as a laptop computer, as is known in the art, and includes a base 12 and a cover 14. Computer 10 includes a central processing unit (CPU) 31 for executing computer software. CPU 31 receives data from memory 32, which may be RAM memory for example, and from disk drive 35, which may be a hard disk drive or a floppy disk drive. CPU 31 receives user input from keyboard 36 and graphical pointing device 18, and displays user output on display 33, which may be an LCD display. As will be appreciated by those skilled in the art, data processing system 10 can be augmented by a peripheral device 20, such as an optical disk drive, modem or network adapter, by attachment to an accessory slot such as a PCMCIA slot.

The present invention is a computer program product for inserting code hooks at the proper entry points in any version of a given Windows operating platform. While the preferred embodiment is described as providing such "floating" code hooks for operating system support of a Windows platform, it will be appreciated that the present invention is applicable to any application where an insertion point for any kind of code must be determined for source code of unknown size. As described in a preferred embodiment, the Windows platform code being converted is assumed to be Windows by Microsoft, Inc., but it should be understood that the present invention is not limited to operation with Windows or with a Windows platform, and can be applied to any software having multiple versions.

In general, a program of any type can be divided into one or more modules. These are separate files which may be executables or libraries, but in some way act cohesively to provide the full function of the program. A module is actually a collection of segments, which may be either code or data segments. Code segments are a collection of functions. Each module contains a public export table which lists all of the segments and offsets of the public functions within each segment.

Figure 2:
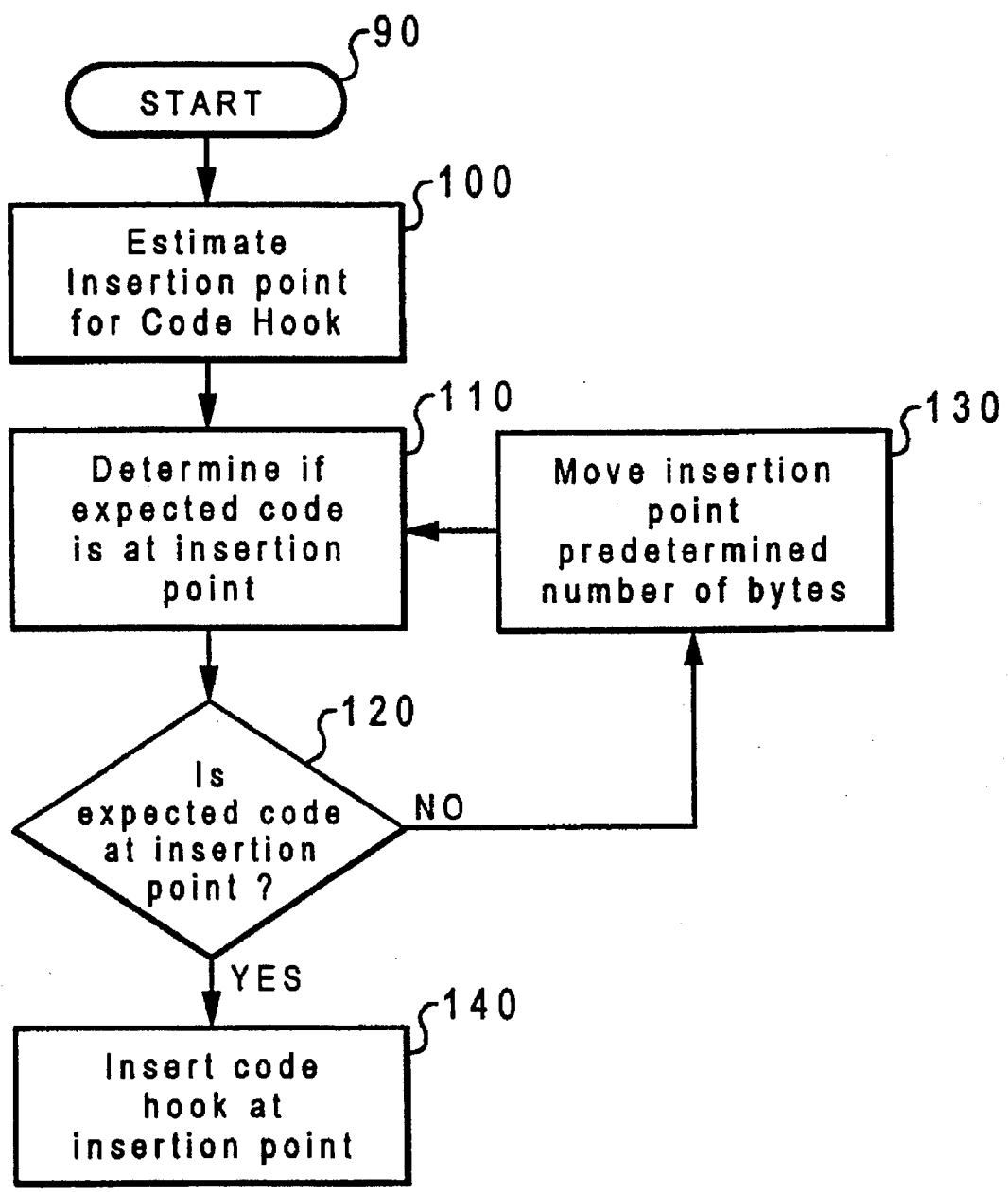
FIG. 2 is a flow diagram of the method of inserting floating code hooks in computer code versions of unknown length, in accordance with a preferred embodiment of the present invention.

Referring now to FIG. 2 there is shown a flow diagram of the method of inserting a floating code hook in a variable length source code, in accordance with a preferred embodiment of the present invention. The process starts at step 90 when a module of an unknown version of the Windows code is loaded into the computer's memory, which will typically be the computer's random access memory (RAM). At the time that the module is loaded into memory, the Fix Manager Script Engine determines that the module requires support code, so a code hook to the required script is inserted at the proper location in the module code to allow the support code to operate at the correct time. Thus, the Fix Manager Script Engine must first determine the correct insertion point for the code hook.

Thus, the insertion point is determined by first estimating the insertion point location, as shown at step 100. Each module of Windows will have a public export table embedded in the beginning of the module by the Windows linker. The public export table includes offsets of where particular functions of the module are located in the code. It is indicated in the public export table that a particular function is found at a particular address offset within the source code. The numerical difference is calculated between this offset and the offset for that function in a principal version of the Windows program. Such a principal version would have known function offsets and code hook locations that are included in the script description for that module's fix code. For example, a principle version of Windows could be the United States (U.S.) version. When an unknown national language version (NLV) of Windows is loaded into the computer's RAM, the differences between offsets found in the public export table of each NLV module loaded into memory and the U.S. version is determined.

This calculation results in a "Skew" factor for each module of the NLV code. For every support code hook to be inserted into a given module, the insertion point for that code hook is estimated by adding the module's calculated skew factor to the known offset for the same code hook in the principle version of the code, resulting in a code hook offset for the loaded module. This produces an estimated insertion point for the code hook in the unknown version of Windows.

The process then proceeds to step 110, where the technique of a preferred embodiment of the present invention provides a verification that the estimated code hook insertion point is correct. The code hook offset is confirmed by verifying that expected code is located at the insertion point. This can be done by checking the code before or after the insertion point, or both. In a preferred embodiment, this check is performed by a checksum on a predetermined number of bytes of code before or after the insertion point. As is known in the art, checksumming is used to verify the integrity of data. The present invention uses the known checksum techniques to verify that the code expected to be located before or after the insertion point is, in fact, located before or after the estimated insertion point derived in the first part of the technique. As used in the preferred embodiment, a checksum is performed on 5 to 10 bytes of code at the estimated insertion point.

As indicated at step 120, the check-sum result is then compared with a precalculated result for the checksum of the code expected at the insertion point. If the checksum produces the expected result, the expected code is located at the estimated insertion point and the process proceeds to step 140, where the floating code hook is inserted at the insertion point. If the checksum does not produce the expected result, the estimated insertion point is not correctly positioned in the Windows source code and must be revised at step 130.

The method of the present invention will revise the estimated insertion point by searching the code within a close proximity, if the estimated insertion point has not been precisely located as verified by the checksum. As indicated at step 130, the insertion point is moved a predetermined number of bytes from the original estimated insertion point. For example, the insertion point is moved one byte above the estimated insertion point. The process then returns to step 110, where a checksum is again performed on the 5–10 bytes preceding, following, or on either side of the new estimated insertion point to verify that the expected code is located at the new insertion point. For example, a checksum is performed on the five bytes above and below the insertion point. If an incorrect checksum is again found at step 120, the insertion point is again moved one byte above the old insertion point and a checksum is performed. This process will repeat the loop through steps 110–130 a predetermined number of times, and then will determine the insertion point cannot be found and the fix will not be implemented.

Therefore, this process proceeds for a maximum number of moves of the insertion point, for example, five moves above the original estimated insertion point. If a correct checksum has not been found in that range of insertion points, the method returns to the original estimated insertion point and begins to move in one byte increments below the estimated insertion point until an insertion point is found producing the correct checksum. Once a correct checksum is found using this procedure, the hook can be exactly placed with assurance at the insertion point. If a correct checksum is not produced over a predetermined range of bytes, or number of moves, the proper insertion point for the code hook cannot be determined, so the code hook is not inserted and the fix is not implemented.

In this manner, the exact hook location can "float" to the correct insertion point regardless of the NLV of Windows loaded into memory. This is quite important because the public export list may not contain enough information to always accurately place each code hook in its proper position within a certain Windows version code. Therefore, according to the present invention, each code hook location description found in a support code script consists of a principal version offset value for the code hook, an expected checksum value, and the range over which the insertion point will be moved to search for the specified checksum. The determination of this range is important because a given checksum value may be found multiple times within a single binary. In the event the search for a match in the checksum value fails to find the correct insertion point, that particular fixed code cannot be executed.

In rare cases a second technique for placing hooks is needed where the Windows modules for a particular NLV are radically different from the U.S. version (as in bi-directional language versions of Windows). In these export modules, Windows code where the hook must be inserted may be different enough that the search for a correct checksum value by the method of the present invention will not produce a valid insertion point. Thus, an alterative to floating the code hook is to specify version specific scripts. A specialized routine for a scripted module will first determine the version level of a Windows module in a generic fashion. Then, when the fix manager processes a module script and encounters multiple version specific sub-scripts, the fix manager can choose the appropriate one based on the version code.

The version code can be identified by counting the number of segments within the Windows module loaded into memory. For example, if the U.S. version of a Windows module is known to have eleven segments and the Thailand version of Windows is known to have twelve segments, the Thailand version can be identified by counting twelve segments in memory. Thus, if a module script is played on a Thai version of a module, the correct offset for a hook location can be determined by reading the location description in the subscript specifically for the twelve segment module. In this alternative preferred embodiment, the support code may contain multiple scripts. A first script would be for the U.S. version, and additional scripts would each be specific for other versions of Windows.

In summary, the present invention provides a method of determining the correct insertion point in an unknown Windows version for a floating code hook to Windows support code. In this way, the fix manager program that implements this method is generic to any version of Windows, including any versions derived from minor revisions made on specific versions, and even is able to operate with future versions not yet created. The present invention allows an operating system's support code to operate independently of the version of Windows loaded into the computer. This creates efficiency and economy by not requiring new versions of the support binaries to be shipped whenever new versions of Windows are produced. Moreover, one set of support binaries and one fix manager program can be used with all present and future national language versions of Windows.

As indicated heretofore, aspects of this invention pertain to specific "method functions" implementable on computer systems. Those skilled in the art should readily appreciate that programs defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method of inserting a floating code hook at a proper position within a program's code, the method comprising the steps of:

(a) estimating an insertion point for a code hook in a computer program loaded in a computer's memory;

(b) determining whether expected code is located at the estimated insertion point;

(c) if the expected code is located at the estimated insertion point, inserting the code hook into the program code at the insertion point;

(d) if the expected code is not located at the estimated insertion point, moving the estimated insertion point a predetermined number of bytes from the estimated insertion point to a new estimated insertion point, and repeating steps (b)–(d).

2. A method of inserting a floating code hook according to claim 1, wherein the computer program has segments of code and wherein there is a principal version of the computer program having equivalent segments to the segments in the computer program and having a known code hook offset, and wherein the step of estimating the insertion point includes reading a public export table containing address offsets for particular segments of the computer program, determining the difference between each segment's offset in the export table and a predetermined offset for the equivalent segment in the principal version, and adding the difference to the principal program's code hook offset to produce an estimate of the insertion point for the code hook in the computer program.

3. A method of inserting a floating code hook according to claim 1, wherein step (d) is performed at most a predetermined number of times, after which the process ends.

4. A method of inserting a floating code hook according to claim 3, wherein the predetermined number of times is ten.

5. A method of inserting a floating code hook according to claim 1, wherein the predetermined number of bytes is one byte.

6. A method of inserting a floating code hook according to claim 1, wherein the estimated insertion point is moved within a predetermined range of bytes.

7. A method of inserting a floating code hook according to claim 6, wherein the range of bytes is ten.

8. A method of inserting a floating code hook according to claim 1, wherein the program code is a Windows platform application and the code hook jumps to operating system support code for Windows.

9. A method of inserting a floating code hook according to claim 1, wherein the determination whether expected code is located at the estimated insertion point includes performing a checksum on a predetermined number of bytes located at the estimated insertion point.

10. A method of inserting a floating code hook according to claim 9, wherein the predetermined number of bytes is ten.

11. A method of inserting a floating code hook according to claim 1, wherein step (d) is performed at most a predetermined number of times, and thereafter further including the steps of counting the number of segments in a Windows module, and executing a script which corresponds to a module having that number of segments.

12. A system for inserting a floating code hook at a proper position within a program's code, the system comprising:
means for estimating an insertion point for a code hook in a computer program loaded in a computer's memory;
means for determining whether expected code is located at the estimated insertion point; and
means for, if the expected code is located at the estimated insertion point, inserting the code hook into the program code at the insertion point, and, if the expected code is not located at the estimated insertion point, moving the estimated insertion point a predetermined number of bytes from the estimated insertion point to a new estimated insertion point.

13. A system for inserting a floating code hook according to claim 12, wherein the computer program has segments of code and wherein there is a principal version of the computer program having equivalent exports of the computer program, and having a known code hook offset, and wherein the means for estimating the insertion point includes reading a public export table containing address offsets for particular exports of the computer program, means for determining the difference between each export's offset in the export table and a predetermined offset for the equivalent export in the principal version, and means for adding the difference to the principal program's code hook offset to produce an estimate of the insertion point for the code hook in the computer program.

14. A system for inserting a floating code hook according to claim 12, wherein means for moving the insertion point will move the insertion point at most a predetermined number of times.

15. A system for inserting a floating code hook according to claim 14, wherein the predetermined number of times is ten.

16. A system for inserting a floating code hook according to claim 12, wherein the predetermined number of bytes is one byte.

17. A system for inserting a floating code hook according to claim 12, wherein the estimated insertion point is moved within a predetermined range of bytes.

18. A system for inserting a floating code hook according to claim 17, wherein the range of bytes is ten.

19. A system for inserting a floating code hook according to claim 12, wherein the program code is a Windows platform application and the code hook jumps to operating system support code for Windows.

20. A system for inserting a floating code hook according to claim 12, wherein the means for determining whether expected code is located at the estimated insertion point includes means for performing a checksum on a predetermined number of bytes located at the estimated insertion point.

21. A system for inserting a floating code hook according to claim 20, wherein the predetermined number of bytes is ten.

22. A system for inserting a floating code hook according to claim 12, wherein the means will move the insertion point at most a predetermined number of times, and further including means for counting the number of segments in a module, and executing a script which corresponds to a module having that number of segments.

23. A computer program product for use in a computer system comprising:
computer usable medium having computer readable program code means embodied therein for estimating an insertion point for a code hook in a computer program loaded in a computer's memory;
computer readable program code means for determining whether expected code is located at the estimated insertion point; and
computer readable program code means for, if the expected code is located at the estimated insertion point, inserting the code hook into the program code at the insertion point, and, if the expected code is not located at the estimated insertion point, moving the estimated insertion point a predetermined number of bytes from the estimated insertion point to a new estimated insertion point.

24. A computer program product according to claim 23, wherein the computer program has segments of code and wherein there is a principal version of the computer program having equivalent exports of the computer program, and having a known code hook offset, and wherein the means for estimating the insertion point includes reading a public export table containing address offsets for particular exports of the computer program, means for determining the difference between each export's offset in the export table and a predetermined offset for the equivalent export in the principal version, and means for adding the difference to the principal program's code hook offset to produce an estimate of the insertion point for the code hook in the computer program.

25. A computer program product according to claim 23, wherein means for moving the insertion point will move the insertion point at most a predetermined number of times.

26. A computer program product according to claim 25, wherein the predetermined number of times is ten.

27. A computer program product according to claim 23, wherein the predetermined number of bytes is one byte.

28. A computer program product according to claim 23, wherein the estimated insertion point is moved within a predetermined range of bytes.

29. A computer program product according to claim 28, wherein the range of bytes is ten.

30. A computer program product according to claim 23, wherein the program code is a Windows platform application and the code hook jumps to operating system support code for Windows.

31. A computer program product according to claim 23, wherein the means for determining whether expected code is located at the estimated insertion point includes means for performing a checksum on a predetermined number of bytes located at the estimated insertion point.

32. A computer program product according to claim 23, wherein the predetermined number of bytes is ten.

33. A computer program product according to claim 23, wherein the means will move the insertion point at most a predetermined number of times, and further including means for counting the number of segments in a module, and executing a script which corresponds to a module having that number of segments.

* * * * *